US005334963A

United States Patent [19]

Wessling

[11] Patent Number: 5,334,963

[45] Date of Patent: Aug. 2, 1994

[54] INERTIA AND INDUCTANCE SWITCHES

[75] Inventor: Francis C. Wessling, Huntsville, Ala.

[73] Assignee: The University of Alabama in Huntsville, Huntsville, Ala.

[21] Appl. No.: 964,932

[22] Filed: Oct. 22, 1992

[51] Int. Cl.[5] ........ H01H 35/00; G01P 15/00

[52] U.S. Cl. ........ 335/2; 73/517 R; 200/61.45 M; 200/61.5

[58] Field of Search ........ 200/61.45 R-61.53; 73/514-520; 335/2

[56] References Cited

U.S. PATENT DOCUMENTS

| | | | |
|---|---|---|---|
| 3,436,499 | 4/1969 | Butts | 200/61.48 |
| 3,459,911 | 8/1969 | Fischer | 200/61.45 |
| 3,493,701 | 2/1970 | Clarke | 200/61.45 |
| 3,569,643 | 3/1971 | Clarke et al. | 200/61.53 |
| 3,601,564 | 8/1971 | Ellison | 200/61.48 |
| 3,685,453 | 8/1972 | Held | 102/70.2 R |
| 3,733,447 | 5/1973 | Schneider, Jr. | 200/61.52 |
| 3,733,448 | 5/1973 | Brady | 200/61.45 R |
| 3,750,100 | 7/1973 | Ueda | 200/61.45 R X |
| 3,769,462 | 10/1973 | Russell et al. | 179/18 AD |
| 3,778,572 | 12/1973 | Matsui et al. | 200/61.45 M |
| 3,793,498 | 2/1974 | Matsui et al. | 200/61.45 R |
| 3,812,308 | 5/1974 | Bell et al. | 200/61.45 R |
| 3,944,764 | 3/1976 | Hirashima et al. | 200/61.45 M |
| 4,042,796 | 8/1977 | Zink | 200/61.45 R |
| 4,336,426 | 6/1982 | Cherry | 200/61.5 |
| 4,877,927 | 10/1989 | Reneau | 200/61.45 M |
| 4,900,880 | 2/1990 | Breed | 200/61.45 M |

*Primary Examiner*—J. R. Scott

*Attorney, Agent, or Firm*—Oblon, Spivak, McClelland, Maier & Neustadt

[57] ABSTRACT

A switch device which includes a magnet movable within a passageway. A wire coil is provided about the passageway such that, as the magnet moves into the coil, a current is induced, thereby providing a signal pulse. The switch can be utilized for sensing changes in inertia, with a stopper opposing movement of the magnet unless the magnet imparts sufficient force against the spring biased stopper to allow the magnet to move along the passageway. The biasing force of the stopper can be adjusted to adjust the amount of force, acceleration or deceleration required for actuating the switch. The switch may also be utilized without the spring-biased stopper, with the magnet preloaded with a spring or weight, such that the switch automatically operates upon removal of a safety pin.

25 Claims, 1 Drawing Sheet

INERTIA AND INDUCTANCE SWITCHES

BACKGROUND OF THE INVENTION

1. Field of the Invention

The invention relates to switches and particularly to switches utilized for sensing a change in inertia. Certain aspects of the present invention are also applicable to switches utilized for purposes other than sensing a change in inertia.

2. Discussion of Background

Often it is desirable to sense a change in inertia for data gathering purposes and/or to initiate an automated sequence of events. For example, in one well-known application, an inertia switch can sense impact of a vehicle in order to actuate a safety device such as an air bag. In addition, in the context of rocketry and missiles, it can be desirable to determine the point at which a certain level of acceleration is attained in order to monitor the rocket or missile, as well as to initiate a sequence of controlled events which are to occur at a predetermined level of acceleration. An inertia switch may also be utilized in the shipping or automotive industries to indicate when predetermined acceleration levels are exceeded, for example in order to avoid excessive acceleration which may cause excessive loads on the engine. Inertia switches may also be utilized for armaments, such that detonation occurs upon impact, or a predetermined period after impact or after launch (e.g., in missile applications).

Typically, an inertia switch will include a mass which moves (i.e. moves relative to other portions of the switch) upon the application of a sufficient force/acceleration to the switch or the body to which the switch is attached. More particularly, when the switch attains a predetermined amount of acceleration, the mass within the switch will be moved to a position which either establishes or breaks an electrical contact in order to produce a signal.

U.S. Pat. No. 3,493,701 discloses an example of an inertia switch in which a magnet holds a ball in a seated position. When the switch encounters a predetermined amount of acceleration, the magnet will be insufficient to maintain the ball in the seated position, and the ball becomes unseated. Unseating of the ball will either break an electrical contact established in the seated position, or will establish a new electrical contact at a location other than the seated position. When functioning properly such an arrangement can provide an adequate indication of a change in inertia. However, it can be difficult to accurately maintain an exact magnetic force such that the ball is only unseated at a desired acceleration level.

In addition, the use of electrical circuit arrangements, in which contacts are established or broken upon acceleration, requires a voltage source which can increase the weight and complexity of the device. Additional monitoring or inspection is also required to ensure that the voltage source is functioning properly. Moreover, electrical contacts can often become oxidized or corroded, thereby diminishing the reliability of the switch. Such contacts are also susceptible to corrosion or dirt preventing proper contact.

Accordingly, a switch is desired which avoids the aforementioned shortcomings. Such a switch should be able to sense changes in inertia, or other conditions, without requiring a voltage source for producing a signal. In addition, the switch should be able to accurately sense changes in inertia without relying upon the establishment or breaking of electrical contacts within a circuit. The switch should also be reliable and inexpensive to build, and not susceptible to the production of an undesired signal as a result of vibration or other conditions which are not desired to be sensed.

SUMMARY OF THE INVENTION

Accordingly, it is an object of the present invention to provide a switch device which can reliably indicate a change of inertia.

It is another object of the present invention to provide an inertia switch having a rugged, yet inexpensive construction.

It is a further object of the present invention to provide a switch device which can produce an electrical pulse without requiring a separate voltage source.

It is a further object of the present invention to provide a switch device which produces a signal in response to movement of a movable object within the switch device, without requiring electrical contacts to sense the movement.

It is yet another object of the present invention to provide an inertia switch having a high natural frequency such that a signal is not inadvertently produced by random accelerations or vibrations.

It is a still further object of the present invention to provide an inertia switch which senses acceleration in one direction, and is not prone to inadvertent signaling as a result of accelerations or shocks in other than the selected direction.

These and other objects and advantages are attained in accordance with the present invention in the form of a switch device which utilizes an induced current produced within the switch. In particular, the present invention includes a housing having a passageway therein, with a magnet provided for movement along the passageway. When utilized for sensing changes in inertia, a stopper or restraint opposes movement of the magnet until the change in inertia is sufficient to overcome the opposing restraint force. Once the change in inertia of the magnet is sufficient to overcome the opposing force provided by the stopper, the magnet moves along the passageway and into a coil which is disposed about a portion of the passageway. As the magnet passes into the coil, a current is induced which thus provides a signal indicative of the change of inertia.

The switch may also be utilized as a mechanical sensor device in which the magnet is preloaded with a spring or weight. Upon removal of a stopping pin, the magnet is fired along the passageway and into the coil, again producing a signal with the induced current.

BRIEF DESCRIPTION OF THE DRAWINGS

A more complete appreciation of the invention and many of the attendant advantages thereof will be readily understood from the following detailed description, particularly when considered in conjunction with the drawings, in which.

DESCRIPTION OF THE PREFERRED EMBODIMENTS

Figure 1:
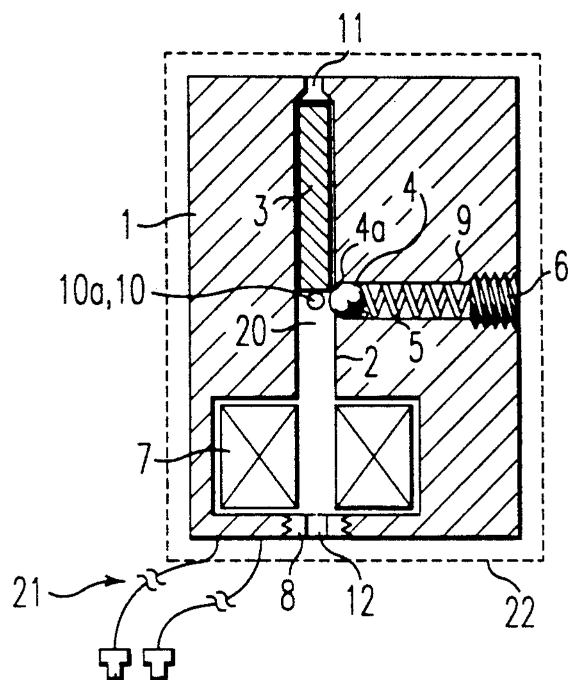
FIG. 1 is a sectional view of an inertia switch device in accordance with the present invention, with the switch in a non-fired or non-actuated position.

Referring now to the drawings, wherein like numerals designate identical or corresponding parts, FIG. 1 depicts a switch which can be utilized for sensing inertia. The switch includes a housing 1 which may be formed, for example, of a molded plastic or machined aluminum. In addition, as discussed hereinafter, the housing may be formed of, or include, a magnetic-shielding material depending upon the application. A passageway 20 extends within the housing, and forms a path of movement for a magnet or firing mass 3. FIG. 1 shows the magnet 3 in the non-actuated or non-fired position. In order to prevent inadvertent firing or actuation of the switch, a pin 10*a* extends into a hole 10 in order to block movement of the magnet along the passageway. Thus, it can be ensured that the switch is not inadvertently actuated during transport or installation. The pin 10*a* is readily removable when it is desired to utilize the switch for sensing inertia.

Partially disposed in the passageway 20 is a stopper 4. The stopper 4 can take the form of a sphere as shown in FIG. 1, however, it may also take the form of a wedge or other shape having an inclined surface 4*a* which contacts the magnet. Preferably, the stopper is formed of a light-weight non-magnetic material, such as nylon.

The stopper should have a light weight, such that it is not subject to inertial forces, particularly inertial forces perpendicular to the passageway 20. The stopper 4 is connected to a spring 5, which in turn is connected to or at least in contact with a screw or plug 6. In the rest position (or when the inertial force of the magnet is insufficient to move the stopper), the spring holds the stopper at a position in which it at least partially projects into the passageway 20. When the magnet 3 applies a sufficient force to the stopper 4, the stopper is pushed into the channel 9 in opposition to the spring 5. It is important that the stopper 4 includes an inclined surface 4*a*, such that the force of the magnet (against the surface 4*a* in a direction along the passageway 20) produces a component force normal to the passageway 20 in opposition to the spring 5. The plug 6 is preferably threaded, such that the amount of force required to move the stopper out of the passageway 20 can be varied, thereby varying the amount of force required to move the stopper into the channel 9 in opposition to the spring 5. In addition, the threaded plug mounting allows the spring and stopper arrangement to be replaced, also to vary the amount of force required to actuate the switch.

At the lower end of FIG. 1, a coil of wire is provided as shown at 7. The coil has an annular configuration, with the passageway 20 extending through the center of the coil. The coil is connected to external wiring 21 such that the signal produced by the coil is provided to external circuitry. The wires 21 can be connected to posts or terminals mounted on the housing, or other suitable electrical coupling devices. The wires 21 may also be provided with terminals 21*a* to allow for easy and secure connection to appropriate circuitry. For example, the signal can be provided to a central processing unit in order to initiate a sequence of events upon receipt of the signal. Preferably, the passageway 20 will include one or more ports 11, 12 to allow for the inlet and outlet of any gas which may be present in the passageway 20, so that differential pressure forces in the passageway 20 will not hinder movement of the magnet 3.

The port 12 is formed in a threaded plug 8, and also allows for resetting of the switch device. In particular, after firing of the switch device, a rod may be inserted into the port 12 to return the magnet to its non-actuated position. The plug 8 also allows for removal and replacement of the magnet. This can allow replacement with a magnet of a different mass, thereby changing the acceleration necessary for actuating the switch. As an alternative to the use of port 12 for resetting, a magnet may also be utilized to move the magnet 3 to the non-fired position as will be discussed hereinafter with reference to FIG. 4.

Since the switch relies upon induction for producing a signal, it may be desirable to include a magnetic shielding material in the housing 1, thereby preventing inadvertent inductance of a current in coil 7. Alternatively, a magnetic shield can be formed about the housing as represented by the broken line 22 in FIG. 1.

Figure 2:
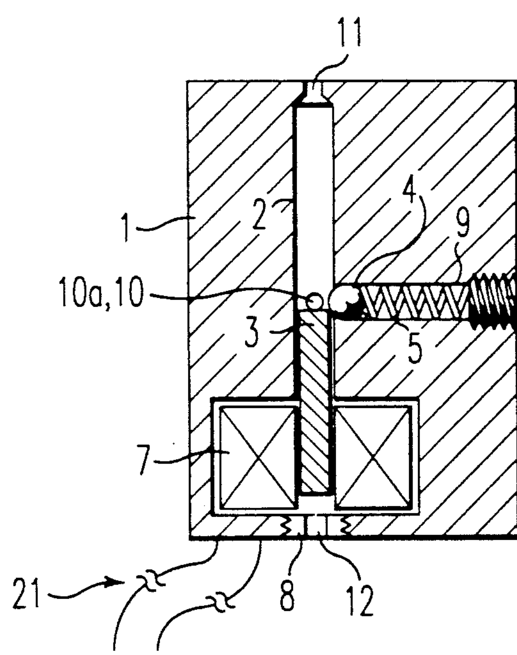
FIG. 2 is a sectional view of the switch device of FIG. 1 in the fired condition.

FIG. 2 shows the arrangement of FIG. 1 after firing. In operation, the switch is mounted upon a device for which inertia sensing is desired. The pin 10*a* is removed such that only the stopper 4 opposes movement of the magnet 3. When the switch (or the body upon which the switch is mounted) encounters a sudden impact, acceleration or deceleration, the magnet will urge the stopper 4 into the channel 9, allowing the magnet to continue movement along the passageway 20 and into the coil 7. The acceleration must occur over a finite amount of time necessary to move the stopper into the channel 9. As the magnet passes into the coil 7, a current is induced in the coil, thereby providing a signal pulse to the wires 21.

As should be readily apparent, the foregoing construction provides an inertia switch of a rugged, simple construction which is easy and inexpensive to build. In addition, due to the low mass, the switch has a very high natural frequency, and thus is not subject to inadvertent firing as a result of random vibrations or accelerations. In addition, since the stopper 4 has a low weight/mass, forces normal to the passageway 20 will not cause movement of the stopper 4 into the channel 9.

The device also requires no external power or voltage source, and thus is not subject to failure resulting from an ineffective voltage source, and does not require monitoring or inspection of the voltage source. In addition, no electrical contacts are required for sensing the switching, since the current is induced as the magnet passes into the coil. The device is also easy to reset, utilizing the port 12, and the safety pin 10*a* prevents inadvertent actuation during transport or mounting.

The inertia switch may also be utilized to determine maximum attained acceleration levels. For example, a bank of switches may be mounted upon a body, with each switch requiring a different acceleration level for firing. The maximum acceleration attained is approximated by the highest acceleration switch fired. An acceleration versus time profile can also be obtained by recording the time at which the various switches are fired. It should be noted that the present invention need not utilize a magnetic firing member or mass 3 (i.e., the firing member 3 need not be magnetic), or a coil 7 if the only concern is to determine the maximum acceleration attained (i.e., without requiring the production of a signal or time information). Thus, a plurality of switches can be utilized to determine a maximum acceleration attained simply by inspection of the switches after the acceleration/deceleration event under consideration. The inspection can be, for example, visual via one of the ports 11, 12; by an additional inspection port; or by providing a construction that can be readily opened or disassembled for visual inspection.

The construction of FIGS. 1 and 2 is also advantageous in that it is not susceptible to inadvertent switching by acceleration other than in a single direction. Due to the low mass of the stopper, accelerations normal to the passageway 20 will not cause firing. In addition, acceleration in the opposite direction of that being sensed merely urges the magnet upward against the housing.

Figure 3:
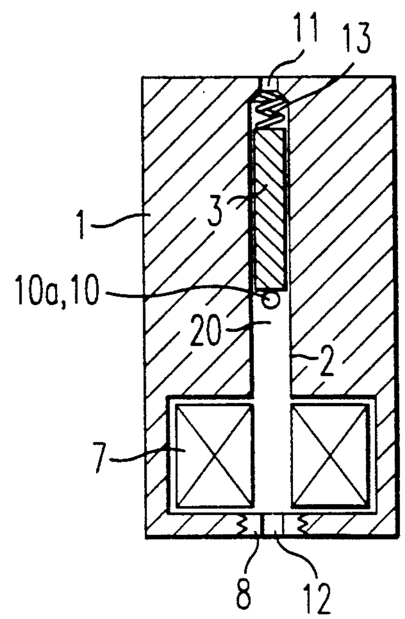
FIG. 3 is a sectional view of a switch device in accordance with the present invention, which may be utilized for purposes other than sensing changes in inertia.

An alternate embodiment of the present invention may also be utilized for applications other than sensing inertia. For example, as shown in FIG. 3, the magnet 3 may simply be preloaded utilizing a spring 13 or a weight (not shown). In this arrangement, removal of the pin 10*a* allows the magnet 3 to be fired along the passageway 20 by the preloaded spring 13. This arrangement can be desirable as a manual signaling device (where the pin 10*a* is simply moved to produce a signal), or for producing a signal upon the occurrence of a mechanical event. For example, in the context of an alarm device, the pin 10*a* may be connected to a door or window, such that movement of the door or window causes removal of the pin and thus fires the switch.

Figure 4:
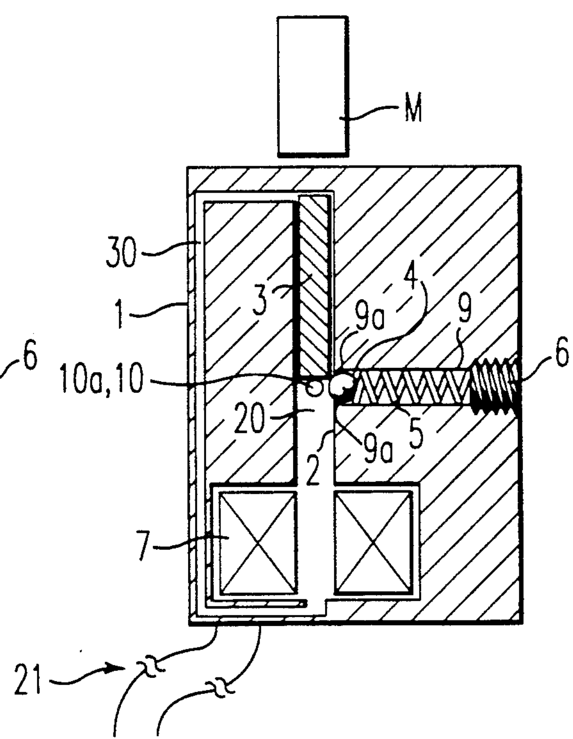
FIG. 4 depicts a switch device of the present invention having alternative features to the FIG. 1 embodiment.

Referring now to FIG. 4, an embodiment depicting alternate features of the present invention is shown. It is to be understood that any of the alternate features shown in FIG. 4 may be utilized separately or in combination in the embodiments depicted in FIGS. 1 and 3. If the switch device is to be utilized in an environment in which cleanliness cannot be guaranteed, it may be desirable to provide a hermetically enclosed switch. Accordingly, in the FIG. 4 arrangement, the ports 11, 12 are omitted and the interior of the switch device is hermetically sealed. In order to avoid adverse effects created by differential pressures within the passageway 20 as the magnet or firing member 3 moves therealong, a channel 30 is preferably provided, with the channel 30 extending from an upper portion of the passageway 20 to a lower portion. Thus, the channel 30 acts to equilibrate pressures along the passageway 20, with the hermetic sealing ensuring movement of the magnet or firing member is not hindered by the accumulation of dirt or debris.

Still referring to FIG. 4, as mentioned earlier, the port 12 of the FIG. 1 arrangement is not essential in resetting the magnet or firing member 3. Alternatively, a magnet M may be provided which is of sufficient strength such that it draws the firing member 3 from the lower end of the passageway 20 to the upper end to thereby reset the switch. If the firing member 3 is a magnetic member, a magnet may also be provided at the lower end of the housing 1, with the magnet at the lower end of the housing repelling the magnet 3. As mentioned earlier, the switch of the present invention may be utilized with a firing member 3 which is not a magnet, with the coils 7 omitted, where it is not necessary to provide an instantaneous signal of firing. With this type of arrangement, a magnet M for resetting can nevertheless be utilized, however, the firing member 3 must be of a magnetic material, even if it is not a magnet.

In accordance with yet another feature shown in FIG. 4, a tapered or shouldered portion 9*a* is provided at an end portion of the channel 9 which is adjacent passageway 20. This arrangement is desirable in maintaining a positively defined rest position for the stopper 4. In particular, the tapered portion 9*a* forms an aperture which communicates the channel 9 and the passageway 20, with the aperture smaller than the diameter of the stopper 4. As a result, the stopper 4 cannot inadvertently enter the passageway 20. The use of a tapered or shouldered section 9*a* provides even greater flexibility from a force adjustment standpoint, since adjustment of the threaded plug 6 will not excessively protrude the stopper 4 to a position at which it may prevent firing movement of the magnet 3, since the tapered portion 9*a* positively defines the rest position of the stopper 4. However, adjustment of the plug 6 will continue to change the amount of compression or load between the plug 6 and the stopper 4, and therefore, adjustment of the plug 6 will continue to vary the amount of force required to move the stopper 4 completely out of the passageway 20 and into the channel 9. Thus, the tapered or shouldered arrangement at the portion of the channel 9 adjacent passageway 20 provides improved reliability while retaining, and even enhancing, the flexibility of the stopper and spring assembly for use in detecting a variety of acceleration levels.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secure by letters patent of the United States is:

1. A switch comprising:

a housing including a passageway therein;

a magnet mounted within and movable along said passageway;

a stopping pin for preventing possible movement of said magnet until removed; and a coil mounted in said housing such that is comprises a spiral around at least a portion of said passageway;

wherein movement of said magnet along said passageway and into said coil causes conduction of a current thereby producing a signal pulse.

2. The switch of claim 1, further including a means for applying a force to said magnet for causing said magnet to move along said passageway.

3. The switch of claim 2, wherein the means for applying a force includes a preloaded spring.

4. The switch of claim 2, wherein said housing contains a hole and a pin projects into said passageway through said hole to prevent movement of said magnet, and wherein removal of said pin from said passageway causes said means for applying a force to move said magnet along said passageway and at least partially inside of said coil.

5. The switch of claim 1, further including an access port in said housing to allow for resetting of said switch by permitting means for applying a force to said magnet in opposition to the direction of said movement such that after said movement, said magnet can be placed in a position occupied prior to said movement.

6. The switch of claim 1, further including magnetic shielding means for preventing an erroneous induction of current in said coil.

7. The switch of claim 1, further including an external magnet positioned outside the housing and relative to said movable magnet for repelling or attracting said movable magnet so as to reset said switch.

8. A switch comprising a housing including a passageway therein:

a magnet mounted within and movable along said passageway;

a coil mounted in said housing such that it comprises a spiral around at least a portion of said passageway; and means for opposing movement of said magnet along said passageway unless said magnet exerts a predetermined amount of force upon said means for opposing movement, said means for opposing movement comprising a spring mounted stopper which at least partially projects into said passageway, and wherein a predetermined inertial force of said magnet causes said stopper to move in opposition to the spring bias to allow the magnet to move along said passageway and into said coil.

9. The switch of claim 8, further including means for adjusting said means for opposing movement to vary the predetermined amount of force.

10. The switch of claim 8, wherein said housing further includes a channel extending at least substantially perpendicular to said passageway, and the spring contacting said stopper is disposed in said channel, and wherein said stopper moves into said channel upon application of a sufficient force by said magnet.

11. The switch of claim 10, further including a threaded plug contacting said spring, wherein movement of said plug varies the predetermined amount of force.

12. The switch of claim 10, wherein a portion of said channel adjacent to said passageway has a reduced cross-section to prevent said stopper from excessively protruding into said passageway.

13. A switch for sensing changes in inertia comprising:

a housing having a passageway therein;

a mass disposed within and movable along said passageway;

a restraint extending at least partially into said passageway for restraining movement of said mass unless said mass exerts at least a predetermined amount of force upon said restraint comprising a stopper which is spring biased into a position at least partially extending into said passageway;

said housing further including a channel at least substantially perpendicular to said passageway, wherein the spring for biasing said stopper is disposed within said channel, and wherein a portion of said channel adjacent to said passageway has a reduced cross-section to prevent excessive protrusion of said stopper into said passageway.

14. The switch of claim 13, further including means for adjusting the predetermined amount of force required for said mass to overcome said restraint.

15. The switch of claim 14, wherein said means for adjusting includes a threaded plug which contacts a spring, said spring contacting said restraint, and wherein rotation of said plug causes movement of at least a portion of said spring thereby varying the amount of force required for said mass to move said restraint in opposition to the spring.

16. The switch of claim 14, further including means for varying a biasing force of said stopper.

17. The switch of claim 15 wherein said mass includes one of a magnet and a magnetic material, the switch further including a magnet external to said housing and relative to said movable magnet for repelling or attracting said mass so as to reset said switch.

18. The switch of claim 13, wherein said mass is a magnet.

19. A switch for sensing changes in inertia comprising:

a housing having a passageway therein;

a stopper which is spring biased to at least partially extend into said passageway;

a magnet disposed within said passageway and movable along said passageway only upon application of a sufficient force by setting said magnet upon said stopper;

a coil disposed such that it forms a spiral around a portion of said passageway such that as said magnet moves along said passageway a current is induced in said coil; and a channel extending at least substantially perpendicular to said passageway, and wherein the spring for biasing said stopper disposed in said channel.

20. The switch of claim 19, wherein a plug is provided at one end of said channel to allow access to said channel, spring and stopper.

21. The switch of claim 20, wherein another end of sad channel has a reduced cross-section to prevent excessive protrusion of said stopper into said passageway.

22. The switch of claim 19, wherein a port is provided at one end of said passageway to allow for resetting of said switch.

23. The switch of claim 19, further including a hole capable of housing a removable pin projecting through said hole and into said passageway for preventing actuation of the switch.

24. The switch of claim 19, further including at least one port extending into said housing to prevent differential pressure forces as said magnet moves along said passageway.

25. The switch of claim 19, further including an adjusting device to vary the sufficient force required for movement of said magnet along said passageway.

* * * * *

UNITED STATES PATENT AND TRADEMARK OFFICE

CERTIFICATE OF CORRECTION

PATENT NO. : 5,334,963

DATED : August 2, 1994

INVENTOR(S) : Francis C. Wessling

It is certified that error appears in the above-indentified patent and that said Letters Patent is hereby corrected as shown below:

Column 1, after the title, line 3 insert the following paragraph-- invention was made with Government support under Grant NAGW-812 awarded by National Aeronautics and Space Administration, Washington, D.C. The Government has certain rights in this invention.--

Signed and Sealed this

Fourth Day of June, 1996

Attest:

BRUCE LEHMAN

*Attesting Officer*

*Commissioner of Patents and Trademarks*